United States Patent [19]
Schrag et al.

[11] Patent Number: 5,540,144
[45] Date of Patent: Jul. 30, 1996

[54] EXTRUSION TYPE SQUARE BALER HAVING SELECTIVE BALE EJECTOR

[75] Inventors: Thomas G. Schrag, Hesston; Cecil L. Case, Newton, both of Kans.

[73] Assignee: Hay & Forage Industries, Hesston, Kans.

[21] Appl. No.: 408,055

[22] Filed: Mar. 21, 1995

[51] Int. Cl.⁶ .............................. B30B 9/30; B30B 15/32
[52] U.S. Cl. ........................ 100/188 R; 100/218
[58] Field of Search ........................ 100/7, 144, 179, 100/188 R, 191, 215, 218

[56] References Cited

U.S. PATENT DOCUMENTS

| | | | |
|---|---|---|---|
| 845,625 | 2/1907 | Field | 100/144 |
| 2,138,604 | 11/1938 | Jones | 100/188 R |
| 2,660,949 | 12/1953 | Russell | 100/188 R |
| 2,714,968 | 8/1955 | Babcock, Jr. | |
| 2,803,357 | 8/1957 | Ronfeldt | |
| 3,060,844 | 10/1962 | Mitchell | 100/188 R |
| 3,426,672 | 2/1969 | Nolt | 100/218 |
| 3,842,732 | 10/1974 | Anderson | 100/188 R |
| 3,999,476 | 12/1976 | Thompson | 100/7 |
| 4,034,543 | 7/1977 | Voth et al. | 56/341 |
| 4,268,199 | 5/1981 | Fontrier | |
| 4,334,466 | 6/1982 | Spiegelberg | 100/7 |
| 4,549,840 | 10/1985 | Ansbjer | |
| 4,791,865 | 12/1988 | Naaktgeboren | 100/188 R |
| 4,829,756 | 5/1989 | Schrag et al. | 100/179 |
| 4,945,719 | 8/1990 | Schrag et al. | 56/341 |
| 5,226,356 | 7/1993 | Schrag et al. | 100/41 |
| 5,253,570 | 10/1993 | Goeckner | 100/41 |

FOREIGN PATENT DOCUMENTS

| | | | |
|---|---|---|---|
| 1233688 | 10/1960 | France | 100/179 |
| 8801271 | 12/1989 | Netherlands | 100/215 |
| 1639477 | 4/1991 | U.S.S.R. | 100/7 |
| 1706452 | 1/1992 | U.S.S.R. | 100/7 |

*Primary Examiner*—Stephen F. Gerrity
*Attorney, Agent, or Firm*—Hovey, Williams, Timmons & Collins

[57] ABSTRACT

Instead of using the compacting plunger of the baler to unload one or more bales from the bale chamber, an auxiliary ejector system may be utilized that enables the operator to select only the last bale for off-loading, or both the last bale and the next-to-last bale. A shuttle assembly housed almost entirely within hollow rails of the bale case has a number of ejector dogs that need not all be placed in operating position simultaneously, thus permitting the operator to choose to actuate only those dogs which are necessary to off-load the bale he selects. The shuttle is repeatedly actuated and retracted through ejecting and reset strokes until the selected bale or bales are fully off-loaded. During the reset strokes the spring-loaded dogs are yieldably folded down under the pressure of the overhead bale so as to avoid retrograde movement of the bale. An inclined bale chute that receives the discharging bales and guides them to the ground may be selectively raised into a folded up transport position using the same power cylinder that drives the ejector shuttle, such powered raising of the chute being enabled when a normally disengaged coupling between the power cylinder and the chute is selectively engaged by the operator.

18 Claims, 10 Drawing Sheets

EXTRUSION TYPE SQUARE BALER HAVING SELECTIVE BALE EJECTOR

TECHNICAL FIELD

The present invention relates to extrusion-type crop balers in which a reciprocating plunger compacts and incrementally moves successive charges of crop material rearwardly in the bale chamber toward and through a restricted outlet. The restricted nature of the outlet causes a lateral squeezing force to be exerted against the rearwardly moving material so as to provide back pressure in the bale chamber for the compacting plunger. In particular, the present invention relates to an auxiliary mechanism that gives the operator the choice of ejecting one or more bales from the chamber when the compacting plunger is stopped, so that bales may be removed from the baler at virtually any time or place, even after harvesting operations have been completed.

BACKGROUND

There is often a need to remove a finished bale from the forming chamber of an extrusion-type square baler when discharging the bales in the normal manner as part of ongoing harvesting operations is not possible or desirable. For example, at the end of a day's operations, completed bales normally remain in the baler and must somehow be removed, even though no additional crop materials will be fed into the machine to force the completed bales out. Thus, it is desirable to provide a way of ejecting those bales even though no new material is being ingested.

Large or mid-size balers producing bales on the order of 900 to 2,000 pounds present particular problems. In those machines, unlike small square balers producing 60 to 100 pound bales, it is impossible for an operator to manually extract the big bales from the machine. Either mechanized handling equipment or a team of men must be used to carry out the task.

Additionally, "custom operators" who bale for hire and serve a number of different customers, need auxiliary ejectors. They frequently find it necessary to unload the last bales from one job at that customer's farm before moving on to the next job. But, it is always important that the operator not unload the leftover partial bale or "prime" in the chamber because extrusion balers are inherently difficult to restart when the chamber is completely empty.

These considerations are magnified where the crop being baled is a silage crop. Silage has an inherently high moisture content which increases the weight of the bale, makes it more difficult to handle, and complicates the ejection process due to increased frictional resistance between the moist bale and the size of the baling chamber.

Although a few bale ejectors are presently commercially available, none has the ability to allow the operator to choose between off-loading only the last bale in the machine or both the last and next-to-last bales in the baler.

SUMMARY OF THE DISCLOSURE

Accordingly, one important object of the present invention is to provide a bale ejection system, especially suited for large or mid-size square balers, which enables the operator to choose between off-loading only the last bale in the chamber, or both the last bale and the next-to-last bales.

Furthermore, an important object of the invention is to provide a bale ejection system which is compact in design, does not adversely affect the overall dimensions of the baler, does not create ground clearance problems, and does not otherwise interfere with the various mechanical motions associated with the baler machinery.

A further important object of the invention is to provide an ejection system which enables one man to easily off-load one or more bales from the machine at virtually any time or place without the need for expensive and frequently unavailable mechanical handling equipment.

Another object of the invention is to provide a system that can be installed on existing balers without the need for extensive redesign of the machines.

Additionally, an important object of the invention is to provide a way of efficiently using the power mechanism of an ejection system as a means for raising and lowering a discharge chute of the baler between an inclined unloading position and a folded up transport position.

These and other important objects of the present invention will be made clear from the description which follows. In brief, the foregoing objects are obtained by the use of a hydraulically reciprocable shuttle that is telescopically received within hollow rails in the floor of the bale case. Slots in the rails allow spring-loaded dogs or projections to be flipped up into working positions when the operator wishes to eject a bale, the dogs being under the control of a special selector mechanism which permits the operator to trigger only certain selected ones of the dogs while leaving the others retracted. By selecting the dogs beneath the end bale for example, while leaving other dogs beneath the next bale unactuated, the operator may off-load just the end bale without affecting the next one. On the other hand, if he chooses to flip up all of the dogs beneath both the end bale and next bale in the chamber, both of the bales will be simultaneously advanced toward and through the outlet as the shuttle is operated.

A selectively engageable coupling between the operating cylinder of the shuttle and the unloading chute remains normally disengaged so that the bale chute stays in its lowered position during ejection. However, if the operator wishes to raise the chute for transport, he need only engage the coupling to lock the cylinder and push rod together, whereupon extension of the cylinder pushes on the rod to in turn push the chute up out of its lowered position and into its upstanding, transport position.

DETAILED DESCRIPTION

Figures 1, 19, 20, 21:
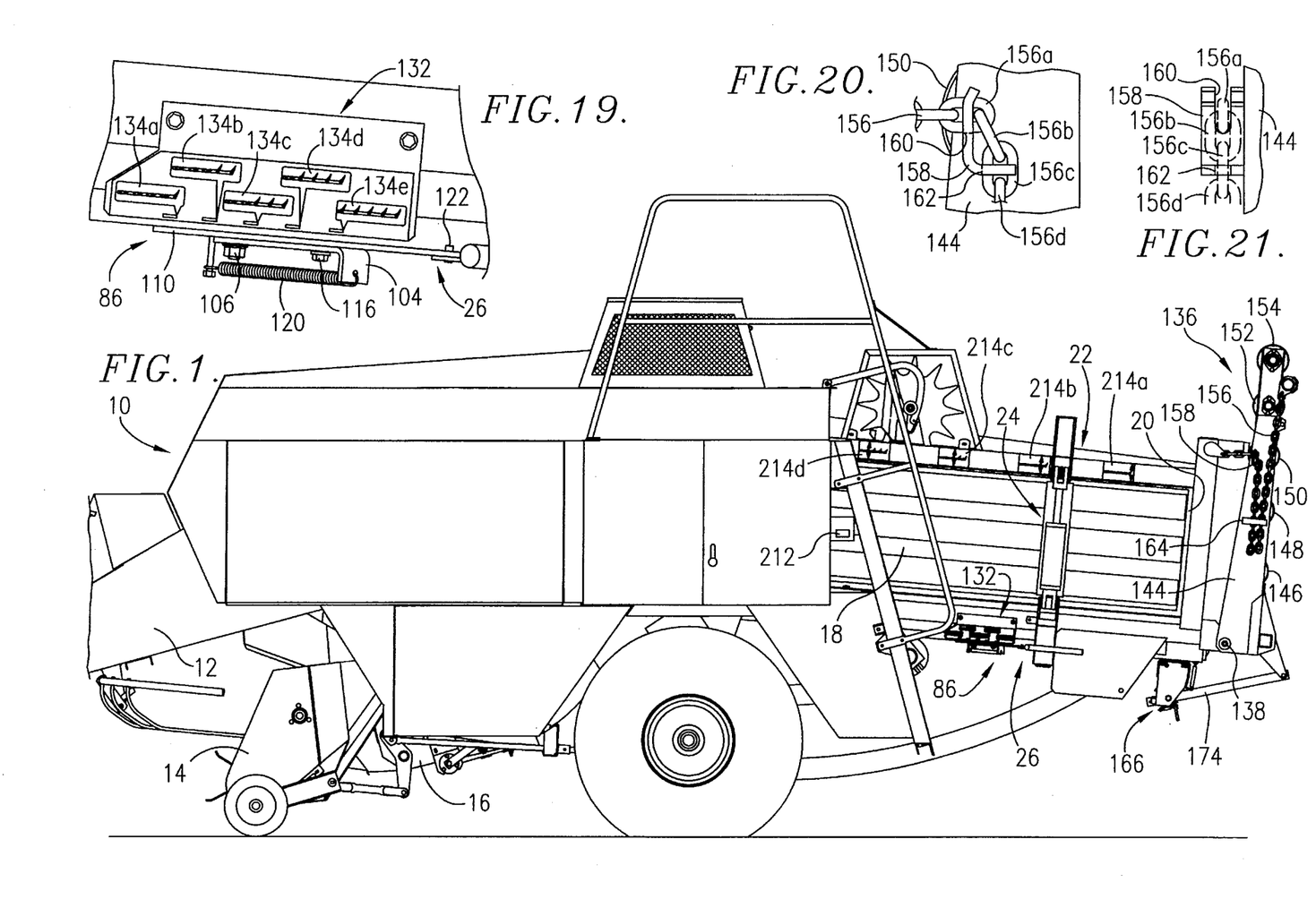
FIG. 1 is a fragmentary, side elevational view of a large square baler incorporating a bale ejection system in accordance with the principles of the present invention.
FIG. 19 is an enlarged side elevational view of indicia on the side of baler associated with the selector lever for determining how many ejecting dogs on each shuttle beam are to be flipped up for bale ejection.
FIG. 20 is an enlarged, fragmentary side elevational view of the chain retainer associated with the bale chute when the chute is in its raised, transport position.
FIG. 21 is a fragmentary end elevational view of the retainer.

The baler 10 in FIG. 1 has been selected for illustration as an example of one type of baler with which the ejector of the present invention may be used. The illustrated baler happens to be an in-line, mid-size baler capable of producing "square" bales weighing on the order of 900 to 1400 pounds, depending upon the moisture content of the bales being made. It will be appreciated, however, that the principles of the present invention are not limited to this particular illustrated baler.

The baler 10 is generally similar in construction and operation to the balers illustrated in U.S. Pat. No. 4,034,543; 4,945,719; 5,226,356; and 5,253,570, the disclosures of such patents being incorporated herein where need be for a full and complete understanding of the present invention. As well understood by those skilled in the art, the baler 10 has a pull tongue 12 by which the baler is hitched to a towing tractor for movement across a field of windrowed crop material ready to be baled. As the baler moves along its path of travel, a pick-up 14 continuously lifts the material up off the ground and delivers it rearwardly into a rearwardly and then upwardly curving duct 16 that leads up into the bottom of a horizontal, fore-and-aft extending bale chamber 18, only the rearmost end of which is illustrated in FIG. 1. The materials fed to the duct 16 may be pre-compressed by mechanism not illustrated before being stuffed up into the bale chamber 18 in preparation for a compaction stroke from a packing plunger (not shown), or the material delivered to the duct by the pickup 14 may be largely uncompacted within the duct and simply stuffed up into the chamber without significant precompaction. In either event, as the compacting plunger works against successive charges of the crop material from the duct 16, it packs such charges against previously compacted material in the chamber 18 and simultaneously advances the entire contents of the chamber rearwardly in incremental steps toward a rear discharge outlet 20 at the back end of the baler.

The dimensions of that outlet and the pressure supplied by sidewalls of a bale case 22 that defines the chamber 18 are controlled by a set of squeeze cylinders 24. Generally speaking, the greater the pressure exerted by the squeeze cylinders 24 on moveable sidewalls of the bale case 22, the greater the squeeze applied against the sides of the bales within the chamber 18 and the greater the resistance to rearward movement of the bales toward and through the outlet 20. Generally speaking, this has a direct bearing on the density of the bales produced by the machine.

The ejector system of the present invention is associated primarily with the rear portion of the baler and is largely hidden from view in FIG. 1. Among the few components that are visible is a selector lever 26 at the bottom of the bale case 22 which is used by the operator when setting up the system for ejecting operations.

Figures 2, 18:
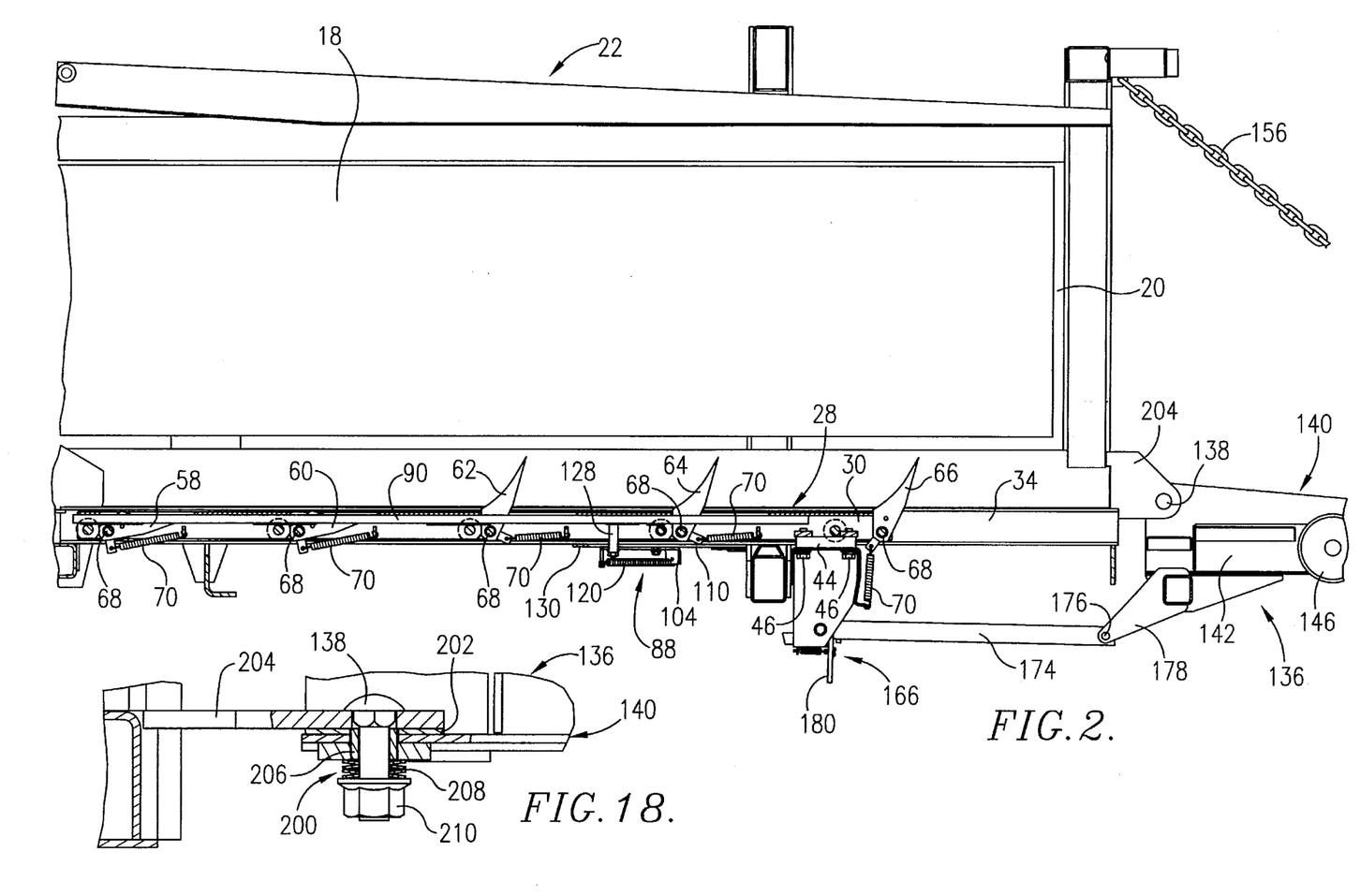
FIG. 2 is an enlarged, fragmentary side elevational view of the rear portion of the baler with the reciprocal shuttle of the ejector system shown in cross section for clarity and with certain of the ejecting dogs flipped up into their operating positions.
FIG. 18 is an enlarged, fragmentary detail view of one of the hinges for the bale chute illustrating construction details of the brake associated with that hinge.
Figure 3:
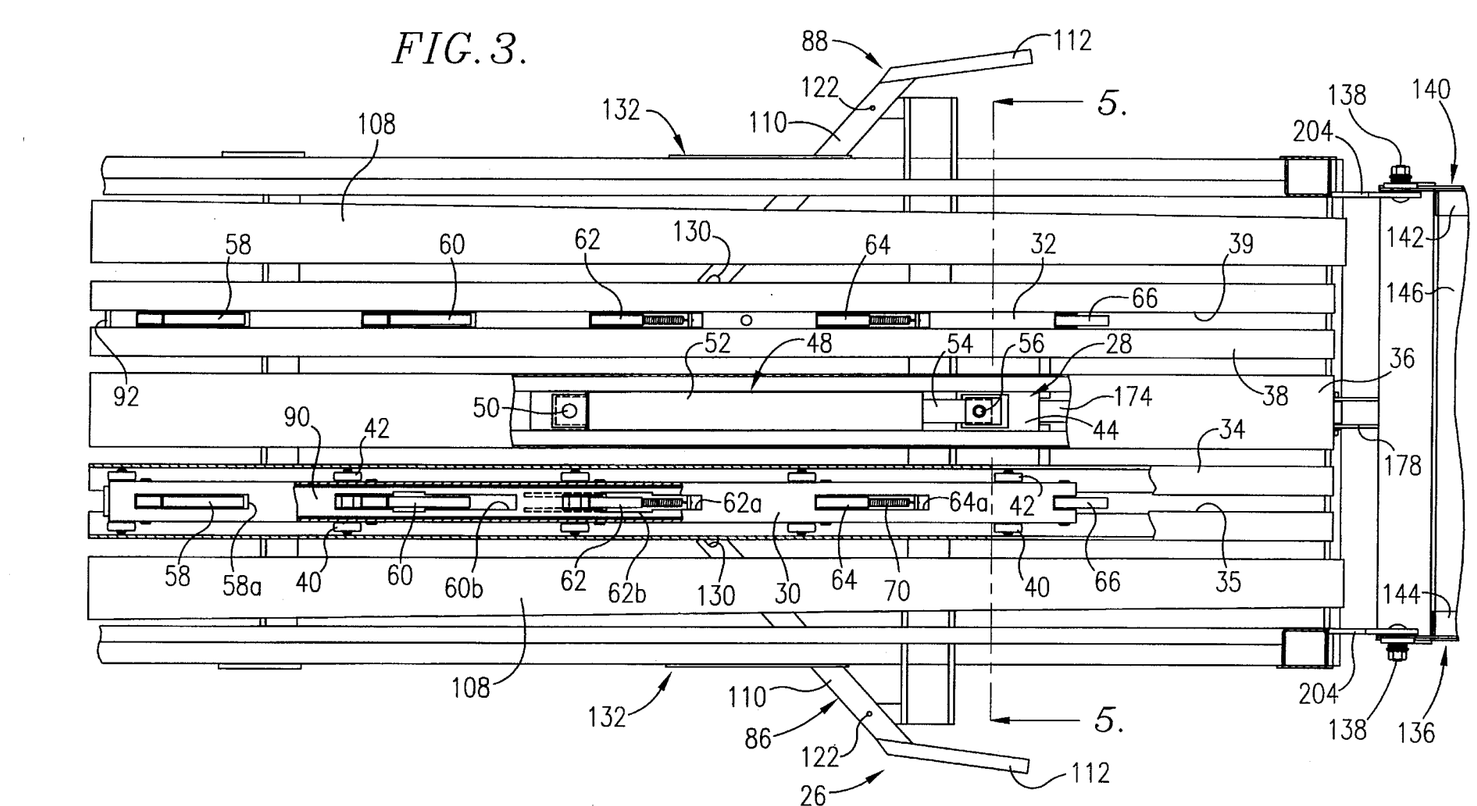
FIG. 3 is a fragmentary, top plan view of the floor of the bale case with portions broken away to reveal details of construction.
Figure 4:
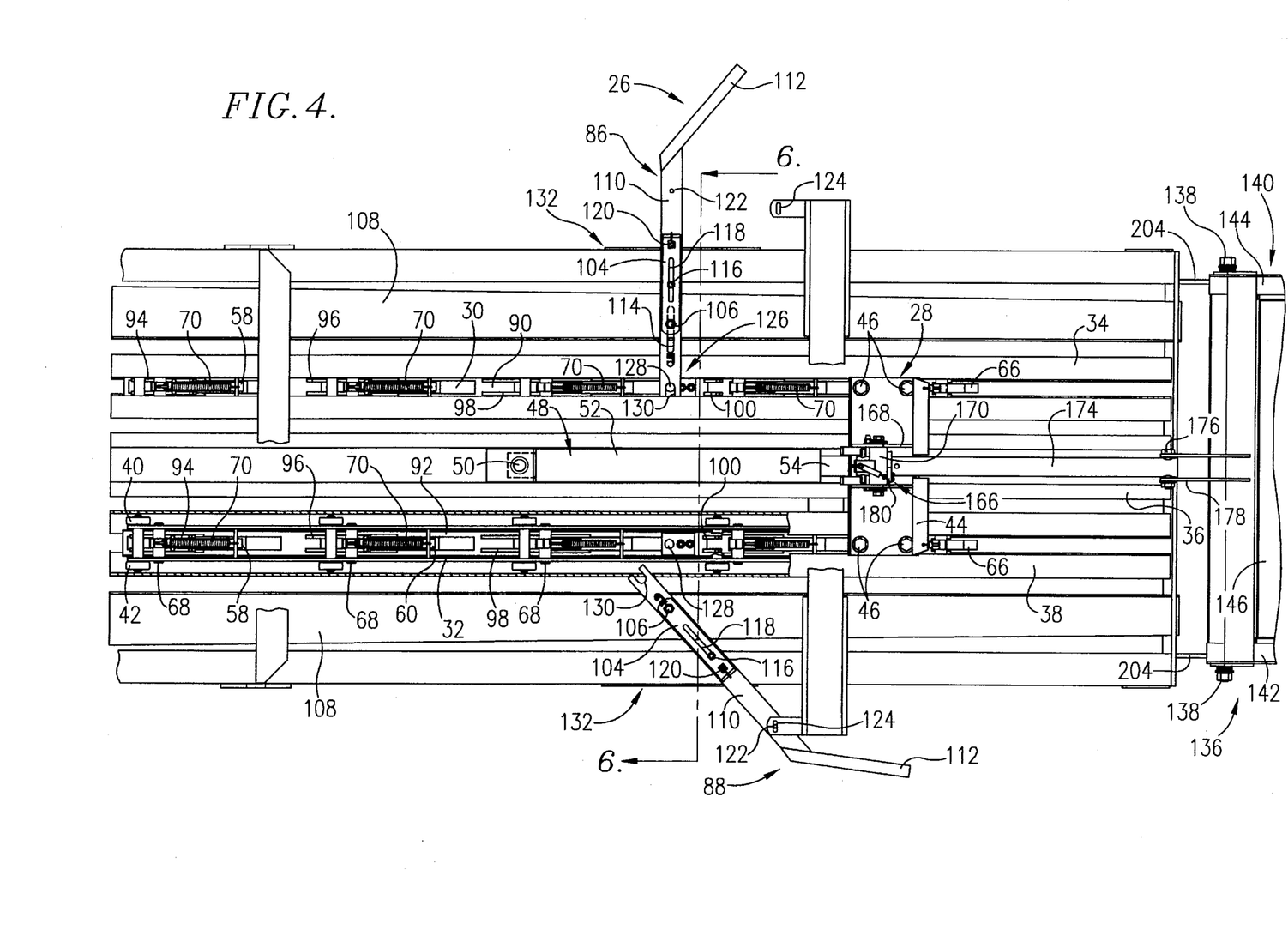
FIG. 4 is a fragmentary, bottom plan view of the bale case with portions broken away to reveal details of construction and with one of the selector levers shown in a neutral position while the other is illustrated in an adjusting position.

By referring to FIGS. 2, 3 and 4 at the outset, it may be seen that the selective ejection system of the present invention includes a reciprocable shuttle 28 having a pair of elongated, axially extending, laterally spaced apart beams or channels 30 and 32. The shuttle 28 is located along the bottom of the bale case 22 and is largely housed within fore-and-aft extending hollow rails 34, 36 and 38 that make up the bottom wall of the bale case 22. These rails 34, 36 and 38 may also be readily seen in FIGS. 5 and 6. The top surfaces of left and right rails 34 and 38 include longitudinal clearance spaces 35 and 39.

Figure 5:
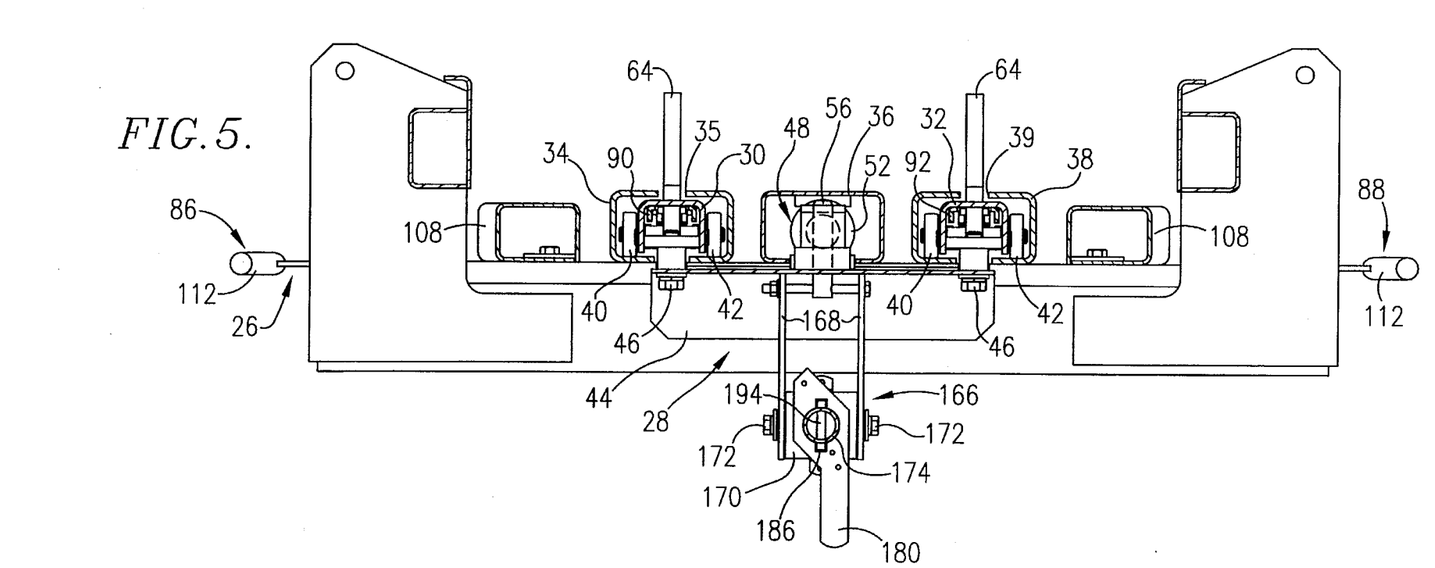
FIG. 5 is a fragmentary, transverse cross-sectional view through the floor of the bale case taken substantially along line 5—5 of FIG. 3.
Figure 6:
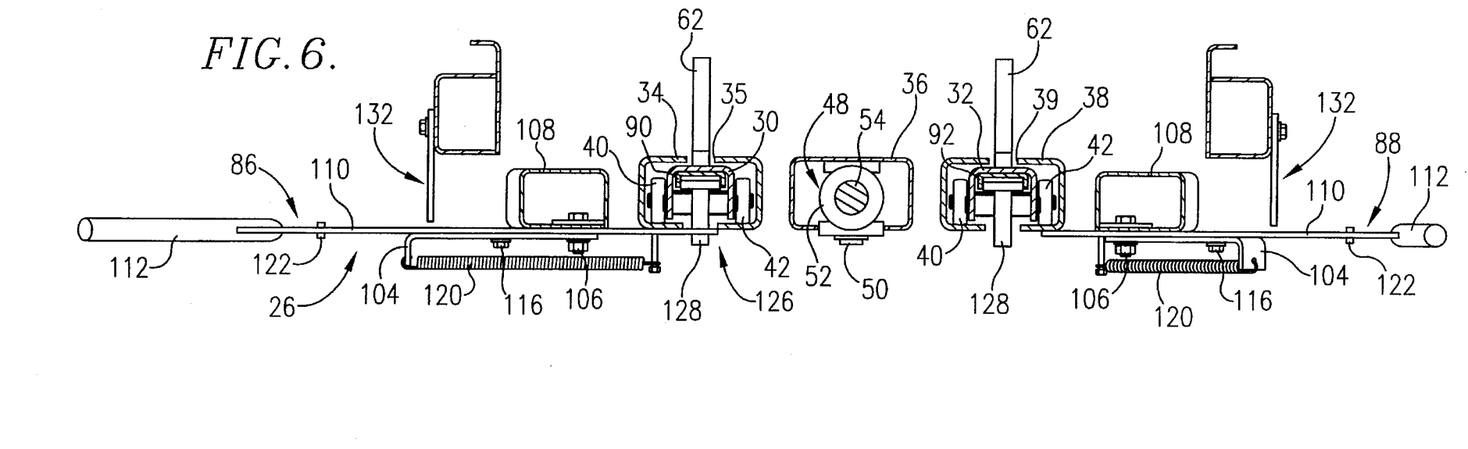
FIG. 6 is a fragmentary, transverse cross-sectional view through the floor of the bale case taken substantially along line 6—6 of FIG. 4.

The two channels 30, 32 are telescopically received within and housed by the corresponding left and right rails 34 and 38 such that the channels 30, 32 take up no more room than the rails 34, 38 themselves. Each channel 30,32 has five sets of anti-friction rollers 40 and 42 spaced along the length of the channel to facilitate axial reciprocation of the channel within its rail. As seen in FIGS. 2, 4 and 5, a transverse tie plate 44 crosses beneath the rails 34, 36 and 38 at the rear end of the shuttle 28 to rigidly connect the two channels 30,32 together such that they move as a unit during operation. Four bolts 46 extend up from the tie plate 44 through slots in the bottom of the rails 34, 38 and into engagement with fixed mounting structure within the channels 30, 32 to secure the plate 44 to the channels 30, 32.

Figure 10:
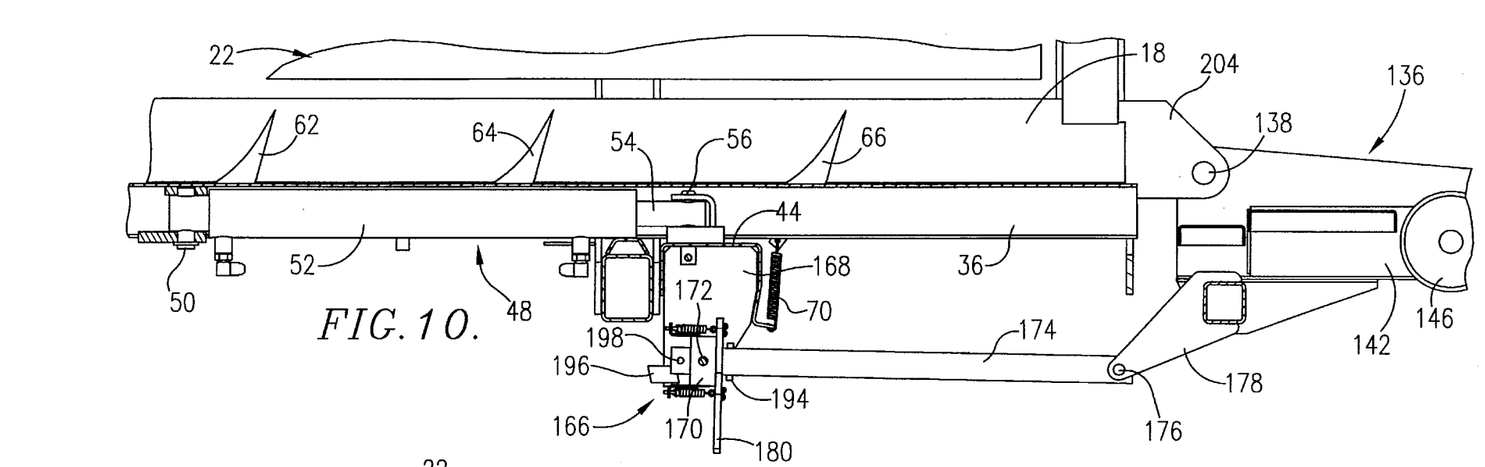
FIG. 10 is a fragmentary longitudinal cross-sectional view of the rear portion of the baler illustrating the shuttle in its retracted, ready-to-eject position.
Figure 11:
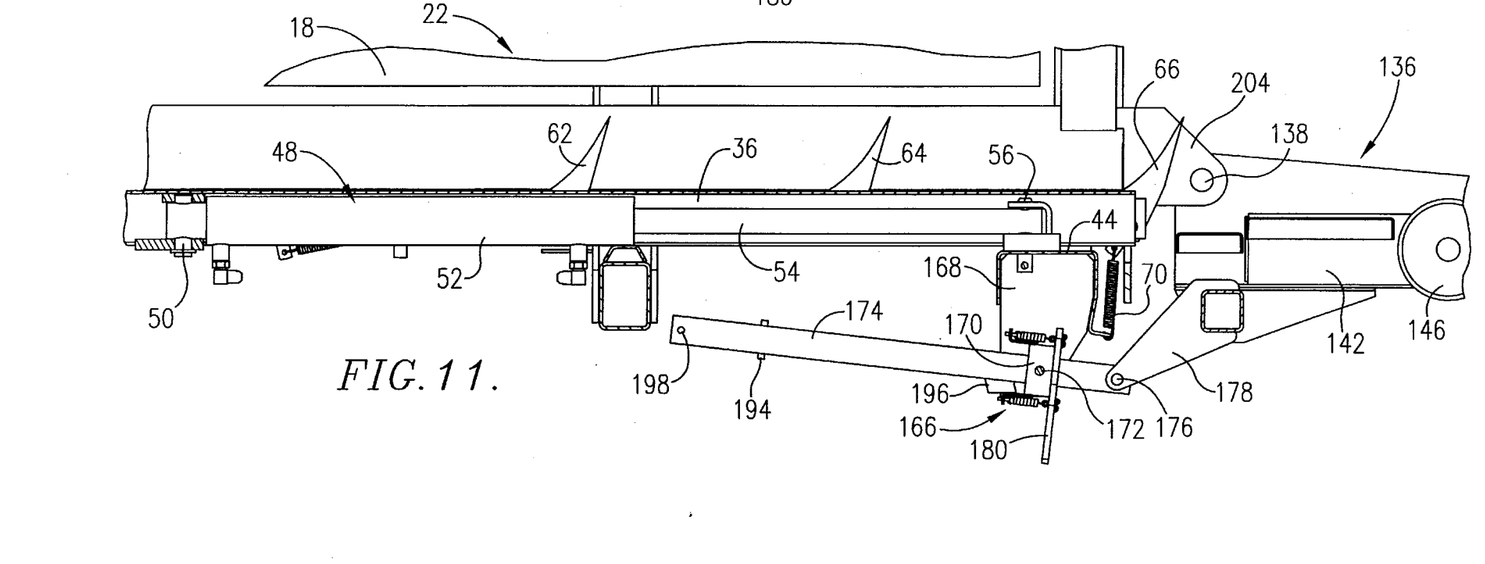
FIG. 11 is a fragmentary view similar to FIG. 10 but showing the shuttle fully extended at the end of an ejection stroke.
Figure 12:
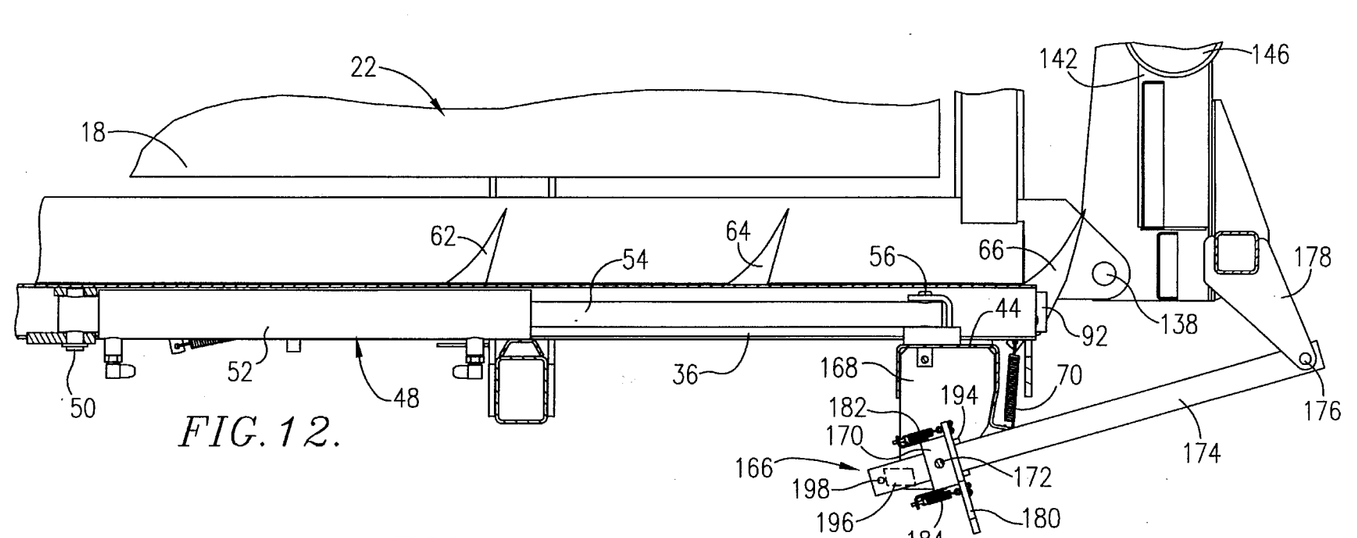
FIG. 12 is a fragmentary view similar to FIGS. 10 and 11 but illustrating the way in which the bale discharge chute is swung up into its transport position when a special coupling is engaged between the power cylinder of the shuttle and the chute.
Figures 13, 17:
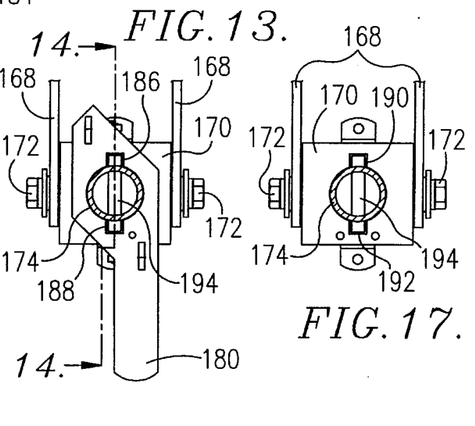
FIG. 13 is an fragmentary, enlarged, transverse cross-sectional view through the push link for the bale chute taken just rearwardly of the engageable coupling between the link and the cylinder, the locking lever of the coupling being shown in its unlocked condition.
FIG. 17 is a fragmentary, transverse cross-sectional view through the push link of the chute with the locking lever removed to reveal construction details behind the lever.
Figure 14:
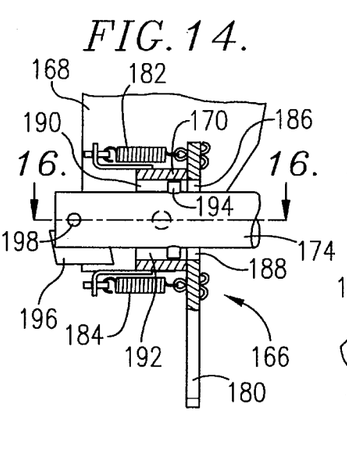
FIG. 14 is a fragmentary longitudinal cross-sectional view thereof taken substantially along line 14—14 of FIG. 13.

Power means for operating the shuttle 28 takes the form of a long, axially extending hydraulic piston and cylinder assembly 48 that is housed within the center rail 36 (see also FIGS. 10, 11 and 12). The base end of the cylinder assembly 48 is fixed to the center rail 36 by a suitable connector 50 such that the cylinder 52 of assembly 48 remains stationary. On the other hand, the rod 54 of assembly 48 telescopes into and out of the cylinder 52 and is coupled at its outermost end via a connector 56 with the tie plate 44 so that when rod 54 is extended and retracted, the tie plate 44 is reciprocated fore-and-aft.

Figure 7:
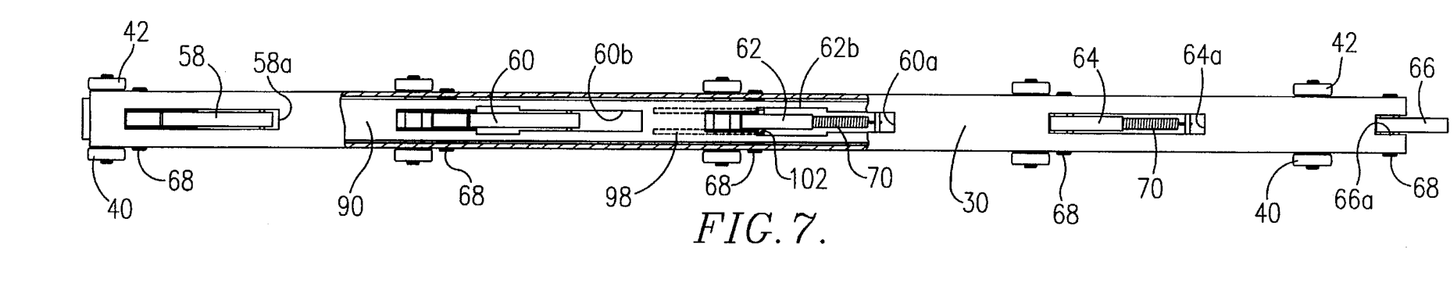
FIG. 7 is a top plan view of one channel of the ejector shuttle with parts broken away to reveal details of construction.

Each of the channels 30,32 carries five projections or ejector dogs 58, 60, 62, 64 and 66 arranged in a series that extends axially of the bale case. All of the dogs 58–66 are identically constructed with each of them being pivotally mounted on a transverse, horizontal stub shaft 68 that spans the downturned legs of the channels and is fixed thereto (FIGS. 2, 4 and 7–9). A tension spring 70 for each dog 58–66 is connected between a crank 72 on the dog and a tab 74 on the channel 30 or 32 so as to yieldably bias the dog toward a flipped up or extended position as illustrated by the dogs 62, 64 and 66 in FIGS. 2 and 8, for example. The dogs are positioned to project up through corresponding apertures 58a, 60a, 62a and 64a in the top surface of the channel when the dogs are in their extended positions. The endmost dog 66 of each channel is so positioned that it largely projects beyond the end of the channel but also moves through a notch 66a in the upper channel surface as illustrated in FIGS. 7 and 9. A straight front edge portion 76 of each dog is disposed to abut the adjacent end 78 of the corresponding aperture 58a, 60a, 62a, 64a and 66a when the dog is fully extended so as to limit the travel of the dogs as they are flipped out by their springs 70. The slot ends 78 also serve as back stops for the dogs 58–66 as they impale the bale and drive it out of the bale chamber during operation, as will be seen.

Each of the dogs 58–66 also has an arcuate, generally concave front edge 80 that leads to a penetrating point 82, the curved edge 80 helping the dog to slip back under the bale during retraction strokes of the shuttle 28 without impaling the bale as will hereinafter be made apparent. A straight pushing edge 84 leads away from the point 82 of each dog on the opposite side of the dog from the curved front edge 80. Note that the dogs do not project up above the top surface of the channels 30,32 when retracted as illustrated by the dogs 58,60 in FIGS. 2 and 8, for example.

The dogs 58–66 are spring-biased toward their flipped up positions as previously described. However, unless a bale is being ejected by the shuttle 28, it is desirable to retain the dogs in their retracted positions. Even during ejection, the operator may wish to have only certain of the dogs 58–66 flipped out while others are retained retracted.

To accomplish this, the ejector system of the present invention further includes a dog selector assembly broadly denoted by the numeral 86. This assembly 86 is usable for determining which of the dogs will be disposed in their extended positions and which will be disposed in their retracted positions. As earlier mentioned, the lever 26 forms one part of the selector assembly 86, but there is also a second selector lever 88 on the opposite side of the baler. In addition, the two channels 30,32 are provided with a pair of corresponding, long, transversely channel-shaped selector members 90 and 92 that are housed within the channels 30,32. Each of the selector members 90,92 is somewhat shorter than its corresponding channel 30 or 32 and is nested within the same in a manner to permit longitudinal shifting of the member relative to its channel. As perhaps shown best in FIGS. 7 and 9, each member 90 has four relatively long clearance openings therein for permitting unobstructed operation of the dogs 58, 60, 62 and 64, such openings being denoted by the numerals 58b, 60b, 62b and 64b. These openings 58b, 60b, 62b and 64b register with the corresponding apertures 58a, 60a, 62a and 64a in the channels 30 and 32. Each member 90,92 is also provided with four bar-like keepers 94, 96, 98 and 100 that are strategically located on the inside of the member at spaced locations along the latter for cooperating with corresponding cam pins 102 on the dogs 58, 60, 62 and 64 to hold one or more of the dogs in their retracted positions, depending upon the longitudinally shifted position of the selector members 90,92.

Figure 8:
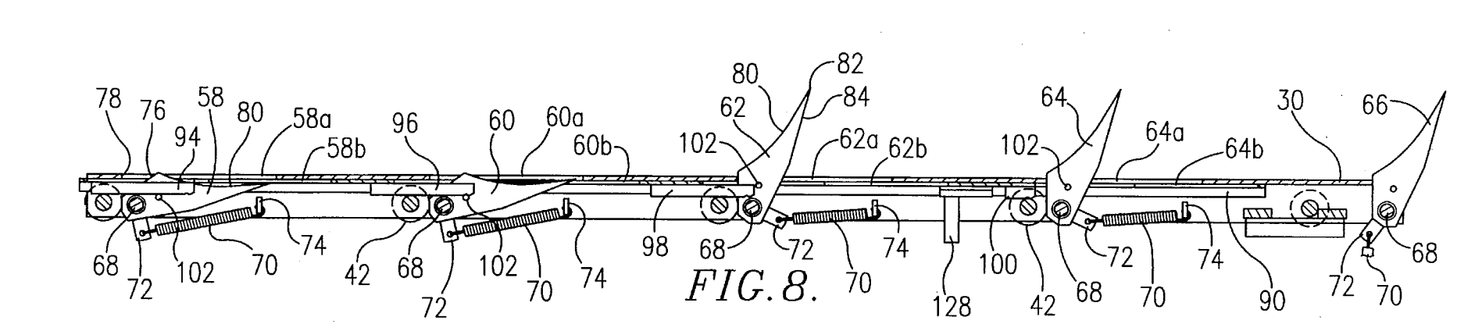
FIG. 8 is a longitudinal cross-sectional view thereof showing the three endmost ejector dogs flipped up into their operating positions.
Figure 9:
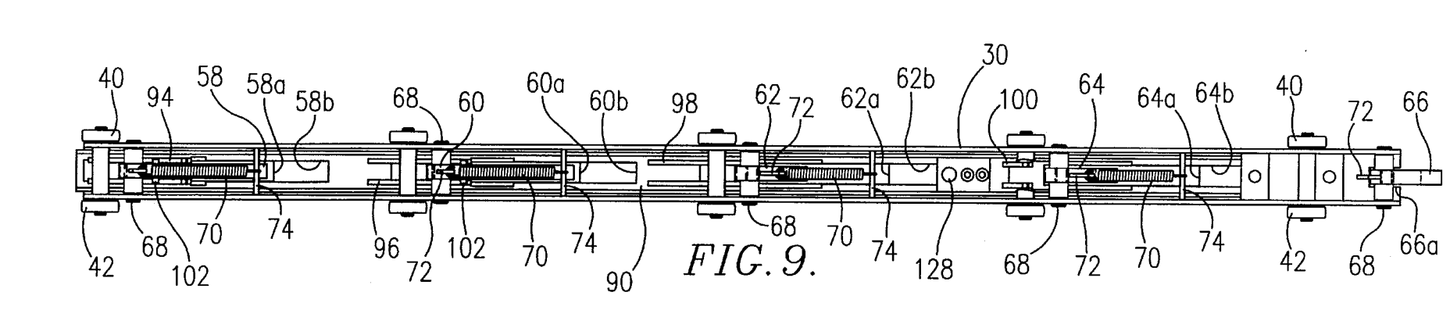
FIG. 9 is a bottom plan view of the shuttle channel of FIGS. 7 and 8.

As illustrated in FIG. 8 with respect to the channel 30, the keepers 94–100 are so spaced along the length of the member that five different patterns of actuated dogs are possible, depending upon the longitudinal position of the member (this total includes the last dog 66 which is not controlled by the selector member and is always flipped up unless a bale is holding it down). In the preferred embodiment, the backends of the keepers 94–100 are all equally spaced from one another, but that distance is slightly less than the spacing between the cam pins 102 of the dogs 58, 60, 62 and 64. For example, the cam pins 102 are spaced 16½ inches apart, while the backends of the keepers 94–100 are spaced 15 inches apart. This produces a staggered effect in which the backends of the keepers 94–100 are progressively closer to their respective cam pins 102 as the front end of the member 90 is approached and necessitates the keepers being progressively longer in a forward position as the front end of the member 90 is approached so that keepers 94 and 96, for example, will still be covering and holding down their cam pins 102 even when the member 90 is shifted rearwardly far enough to cause the keeper 100 to hold down its cam pin 102.

For example, in the condition illustrated in FIGS. 7, 8 and 9, as well as others, the member 90 is positioned such that the keeper 100 is spaced back away from the cam pin 102 of dog 64 by two increments, thus permitting the dog 64 to be in its flipped up condition. The next keeper 98 is spaced back from its cam pin 102 on the dog 62 by only one increment, but that is enough to allow the dog 62 to also remain in its flipped out position.

However, the next keeper 96 to the left is positioned to actually engage and hold down its dog 60 at this time. Finally, the left-most keeper 94 is positioned to engage and override the pin 102 of its dog 58 even further.

As a result of this staggered arrangement, it will be seen that if the member 90 is shifted two positions to the left viewing FIG. 8, all four of the dogs 58, 60, 62 and 64 will be allowed to flip up, because all four of the keepers 94, 96, 98 and 100 will be out of holding engagement with the cam pins 102 of their dogs.

If the member 90 is then shifted one increment to the right from the "all out" position just discussed, the left-most keeper 94 will engage and hold down its dog 58, but the remaining keepers will still allow their dogs 60, 62 and 64 to be flipped out. Shifting the member 90 to the right two increments from the "all out" position establishes the condition of FIG. 8 wherein the two dogs 58 and 60 are retained in their retracted positions, while the dogs 62 and 64 remain disengaged by their keepers and thus out in their extended positions. Shifting the member 90 three increments to the right of the "all out" position causes the keeper 98 to engage and override the pin 102 of dog 62 such that, now, dogs 58, 60 and 62 are held down while dog 64 remains up. Finally, when the member 90 is shifted four increments to the right from the "all out" position, the keeper 100 overrides the pin 102 of dog 64 such that all four of the dogs 58, 60, 62 and 64 are now held down against flipping out. In that condition, only the endmost dog 66 remains flipped out.

In order to shift the selector members 90 and 92 between their various selectable positions, the levers 26 and 88 of assembly 86 are used. In the preferred embodiment, the levers 26 and 88 are biased to a neutral position so that they remain disengaged from the members 90,92 until they are intentionally re-engaged to carry out a selection. For purposes of illustration, FIG. 3 shows both of the levers 26, 88 in their neutral positions, while FIG. 4 shows the lever 26 engaged with member 90 and the lever 88 disengaged from its member 92.

With particular reference to FIGS. 3, 4, 5 and 6, it will be seen that each of the levers 26, 88 includes a generally L-shaped support bar 104 that is swingably attached to a stationary structural tube 108 of the bale case floor by a vertical pivot bolt 106 such that the support bar 104 may swing horizontally in a generally fore-and-aft direction about the pivot 106. Captured between the mounting bar 104 and the tube 108 is a long, flat strap 110 having a grasping handle 112 at its outer end. The strap 110 has a longitudinal slot 114 (FIG. 4) that receives the pivot bolt 106 such that the strap 110 may be shifted longitudinally of the mounting bar 104 generally toward and away from its corresponding selector member. A guide pin 116 is fixed to the strap 110 and projects downwardly therefrom through a longitudinal slot 118 (FIG. 4) in the support bar 104 so as to maintain the strap 110 in proper superimposed registration with the support bar 104 during longitudinal shifting of the strap 110 relative to the bar 104. A tension spring 120 is connected between a downturned leg of the support bar 104 and a depending pin on the inner end of the strap 110 so as to yieldably bias the strap 110 outwardly toward its neutral position as illustrated by the selector lever 88 in FIGS. 4 and 6, for example. A locking peg 122 on the strap 110 adjacent the handle 112 is designed to be placed within a retaining hole 124 on a structural frame piece of the baler when the selector lever is fully withdrawn to its neutral position so as to conveniently hold the lever against unintended movement while the baler is in operation.

Each of the members 90, 92 and its corresponding selector lever 26, 88 is provided with a selectively engageable connection 126. To this end, each member 90,92 has a peg 128 which depends therefrom between the dogs 62 and 64 (see also FIG. 8), such peg 128 being receivable within a mating notch 130 in the adjacent end of the lever strap 100. Thus, when the selector lever is grabbed by its handle 112 and shoved forcibly inwardly from its neutral position, the notch 130 may receive the peg 128 as illustrated by the lever 26 in FIG. 4. When the lever is in its neutral position as illustrated by the lever 88 in FIG. 4, the notch 130 is disengaged from the peg 128.

As illustrated in FIG. 1, the selector assembly 86 also includes an indicia plate 132 for each selector lever 26,88 that permits the operator to visually choose the desired combination of extended and retracted dogs. As illustrated in more detail in FIG. 19, the indicia plate 132 on each side of the bale case includes illustrations of five different lever positions, denoted by the five decals 134a, 134b, 134c, 134d and 134e. These decals illustrate that when the lever 26 or 88 is engaged with its corresponding selector member 90 of 92 and is swung toward the front of the baler to the full extent such that lever 26, for example is registered with decal 134a, the four dogs, 58, 60, 62 and 64 will all be retained in their retracted position, leaving only the dog 66 unaffected. If the lever is then disengaged from its selector member and placed in its neutral position, the selector member will maintain the dogs 58, 60, 62 and 64 retracted, which is normally the preferred condition throughout the baling process as bales are successively discharged from the baler in the usual manner by action of the compacting plunger as it builds new bales and pushes finished ones toward the discharge outlet 20. Engaging each of the selector levers with their corresponding members and placing them in any of the other adjusted positions registered with decals 134b, 134c, 134d or 134e releases the dogs in accordance with the illustration on the particular decal with which the selector lever is registered.

Bale Chute

With initial reference to FIG. 1, it will be seen that the baler 10 is provided with a bale discharge chute 136 that is hingedly connected at 138 to the rear of the baler. The chute 136 is illustrated in its raised or transport position in FIG. 1.

The chute 136 basically comprises an open frame 140 having a pair of parallel arms 142 and 144 that rotatably support five freely rotatable, transversely extending rollers 146, 148, 150, 152 and 154 (FIG. 1). Thus, the rollers 146–154 serve as anti-friction means for supporting and guiding a bale down to the ground when the chute 136 in its lowered position of FIG. 2.

A pair of chains 156 on opposite sides of the baler (only one chain being illustrated) are connected between the frame of the baler and the outer end of the bale chute to limit the extent of downward movement of the chute 136 and thus prevent it from going beyond the unloading position of FIG. 2. As seen in detail in FIGS. 20 and 21, and in the overall view of FIG. 1, each chain 156 is also used to lock the chute 136 in its raised, transport position. This is accomplished through the use of a generally L-shaped chain retainer 158 fixed to the corresponding leg of the chute 136 as illustrated with respect to the leg 144 in FIGS. 20 and 21.

A first notch 160 in the retainer 158 is wide enough to receive a link 156a of the chain 156 when such link 156a is turned sideways, yet is too narrow to prevent the next transversely disposed link 156b from pulling through the notch. An additional safety notch 162 at the other end of the retainer 158 is similarly dimensioned so as to receive a third link 156c when such link is placed on edge, yet is too narrow to permit passage therethrough of a fourth, transverse link 156d. This arrangement securely holds the chute 136 in its transport position, yet allows the operator to easily release the chute for movement into its unloading position when it is time to commence operation of the baler. As shown in FIG. 1, the chain 156 may be conveniently draped within a rigid loop 164 fixed to the corresponding leg of the chute 136 when the chute is in its transport position so as to confine the chain during such transporting movement, yet allow it to freely pay out as the chute is lowered into its unloading position.

The chute 136 is designed to be hydraulically raised from its unloading position to its transport position. To permit the cylinder 48 to be used as a power lift device for the chute 136 when such lifting is desired, yet also cause the cylinder 48 to have no influence over the chute at other times, a special, selectively engageable coupling 166 is provided between the rod end of the cylinder 48 and the chute 136. The coupling 166 includes a pair of side-by-side, slightly spaced apart plates 168 that are fixed to the bottom of the tie plate 44 and depend therefrom in axial alignment with the power cylinder 48. At the lower ends of the plates 168, a collar 170 is secured thereto by a pair of aligned, transverse trunnions 172 (FIGS. 10–17) such that the collar 170 may swivel about a transverse horizontal axis through the trunnions 172. The coupling 166 further includes a push link 174 that is slideably received within the collar 170 and is pivotally connected at its rearmost end by a pivot 176 to a rigid crank arm 178 fixed to the frame of the chute 136.

The coupling 166 has a disengaged mode or condition in which the collar 170 simply slides back and forth along the push link 174 during extension and retraction of the rod 54 of power cylinder 48. However, it also has an engaged mode in which the collar 170 is latched to the otherwise free end of the push link 174 at the position illustrated in FIG. 10 such that when the power cylinder 48 is then actuated with the collar latched to the link 174, the push link 174 will be effective to raise the chute 136 into the transport position in the manner illustrated in FIG. 12.

Such engagement and disengagement of the coupling 166 is accomplished through manipulation of a locking lever 180 which projects down from the push link 174 on the rear side of the slip collar 170. The locking lever 180 is rotatably received on the cylindrical, exterior surface of the tubular push link 174 and is yieldably held up against the rear face of the collar 170 by a pair of upper and lower tension springs 182 and 184. A pair of diametrically opposed keyways 186 and 188 in the locking lever 180 are disposed such that the lever 180 can be rotatably positioned with the keyways 186,188 registered with corresponding keyways 190 and 192 in the collar 170. This permits free passage through the collar 170 and the locking lever 180 of a cross pin 194 fixed to the push link 174 and projecting outwardly beyond opposite sides thereof. This condition is illustrated, for example, in FIGS. 13 and 14.

Figure 15:
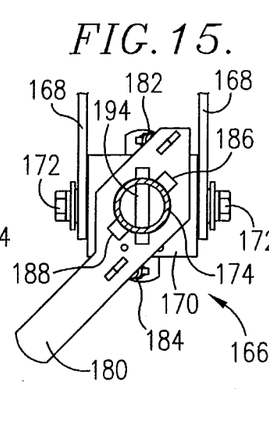
FIG. 15 is a fragmentary, transverse cross-sectional view through the push link of the chute similar to FIG. 13 but with the locking lever shown in its locked position to engage the coupling.
Figure 16:
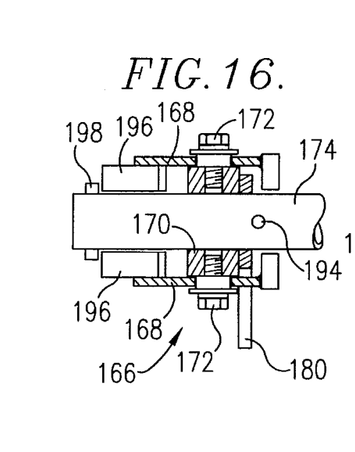
FIG. 16 is a fragmentary, longitudinal cross-sectional view of the coupling taken substantially along line 16—16 of FIG. 14.

On the other hand, when the locking lever 180 is rotated slightly to the position illustrated in FIG. 15, for example, the keyways 186 and 188 of the lever 180 do not allow the cross pin 194 of the push link 174 to pass through lever 180. Thus, if the power cylinder 48 is in a retracted condition such that the cross pin 194 is disposed on the rearward side of the lever 180 as illustrated in FIG. 10, rotation of the lever 180 to the latched position in FIG. 15 will cause the cross pin 194 to remain on the rear side of the lever 180 as the cylinder 48 is subsequently extended, thus operably coupling the cylinder 48 with the chute 136 so as to transfer lifting force to the latter via the coupling 166 and the push link 174.

The two depending plates 168 are provided with a pair of blocks 196 (FIGS. 14 and 16) adjacent their lower front extremities which are disposed to bear against a cross peg 198 in the proximal end of the push link 174 when the chute 136 is being lowered from its transport position of FIG. 12 to its unloading position of FIGS. 10 and 11. Such engagement between the blocks 196 and the cross peg 198 may be necessary during initial retraction of the power cylinder 48 when the chute 136 is fully raised in order to position the center of gravity of the upstanding chute 136 to the rear of the hinge points 138. Once the center of gravity has been thus shifted, the weight of the chute 136 will then be transferred through the push link 174 to the rear face of the locking lever 180 via the cross pin 194.

In the preferred embodiment, a suitable friction brake 200 at each hinge 138 as illustrated in FIG. 18 is provided in order to retard the downward swinging motion of the chute 136. One form of suitable friction brake 200 may include an annular brake pad 202 sandwiched between a mounting lug 204 on the bale case and a structure associated with the frame 140 of the chute 136. A bushing 206 surrounds the hinge pin 138, and a suitable spring washer 208 is trapped between the outer end of the bushing 206 and a nut 210 on the threaded end of the hinge pin 138. Rotational adjustment of the nut 210 thus adjusts the compressive force applied by the spring washer 208 against the brake pad 202.

OPERATION

In the preferred embodiment, the ejector system of the present invention is operated through the use of a control switch 212 on the left rear side of the baler as illustrated in FIG. 1. Thus, it is contemplated that, rather than operating the system from the tractor seat, the operator will step down off the tractor and stand at the left side of the baler as he operates the system through the control switch 212. Prior to such operation, however, he will first have performed a series of preparatory operations.

First, assuming that the bale chute 136 is in its lowered position of FIGS. 2, 3, 4, 10 and 11, the operator needs to relieve the pressure in the squeeze cylinders 24 so that the bales may be more easily moved out of the bale case 22. This is accomplished by actuating the switch 212 in one direction, which causes controls in the tractor cab to automatically relieve pressure.

Then, the operator needs to determine how many of the ejector dogs 58–66 are to be raised in order to off-load the bale or bales he desires. In the preferred embodiment, four decals 214a, 214b, 214c and 214d (FIG. 1) are provided along the top edge of the bale case 22 to assist the operator in making this decision. If the front end of the bale to be ejected is between the arrows on the decals 214b and 214c, the operator need not raise any of the dogs, because the rearmost dog 66 will automatically flip up during the ejection stroke. If the front end of the bale is between the arrows of the decals 214a and 214b, then the dog 64 should be flipped up as well as the end dog 66. If the front end of the bale is between the arrows of the decals 214c and 214d, the dogs 62, 64 and 66 should be flipped up, while if the front end of the bale is forward of the arrow for decal 214d, at least the dogs 60, 62, 64 and 66 should be flipped up. Optionally, all five of the dogs 58, 60, 62, 64 and 66 could be flipped up for the ejection stroke.

After determining how many dogs to actuate, the operator then removes one of the selector levers 26 or 86 from its storage position in which the locking peg 122 is retained within the corresponding retaining hole 124. Such lever is then pushed inwardly to engage the peg 128 of the corresponding member 90 or 92 within the notch 130 of the lever. Thereupon, the lever can be swung about the pivot 106 in the appropriate forward or rearward direction to appropriately displace the member 90 or 92 within the corresponding channel 30 or 32. When the outer end of the lever comes into vertical registration with the appropriate decal 134a, b, c, d or e of the indicia plate 132 (FIG. 19), the operator stops further actuation of the lever and allows the coil spring 120 to disengage the notch 130 from the peg 128 so as to place the lever in its neutral position. The operator then returns the peg 122 of the lever to the retaining hole 124 and walks to the opposite side of the baler to repeat the process with the remaining selector lever 26 or 88.

In the preferred embodiment, the two selector levers 26 and 88 are manipulated independently of one another such that the members 90 and 92 thereof are likewise independently adjustable relative to one another, although the members 90,92 move in unison with the channels 30,32 of the selector shuttle 28 when the shuttle moves through its operating strokes.

FIGS. 22–27 illustrate the situation in which only the last or end bale 216 is to be ejected and the front end 216*a* of the bale 216 is located between the arrows of the decals 214*b* and 214*c* in FIG. 1. Thus, the operator chooses the position for the two selector levers 26 and 88 represented by the decal 134*b* in FIG. 19 wherein the endmost dog 66 and the next dog 64 will be placed in action.

Figure 22:
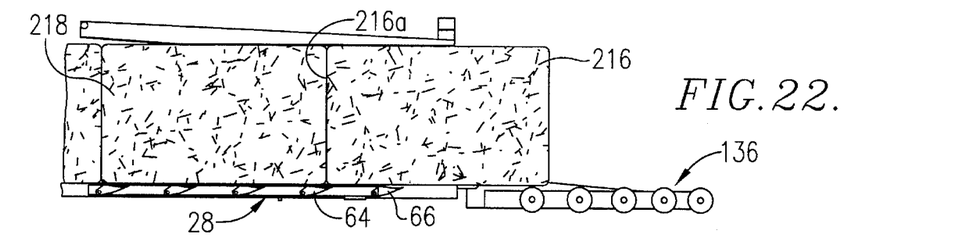
FIGS. 22–27 are schematic illustrations of the way in which the selective ejector of the present invention is used to eject only the end bale from the baler.
Figure 23:
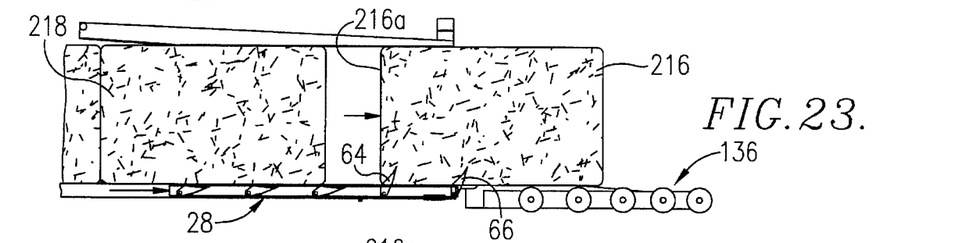

As shown in FIG. 22, prior to any rearward ejecting stroke of the selector shuttle 28, all of the dogs are in their retracted positions, including the last two dogs 64 and 66 because of the presence overhead of the end bale 216 and the next-to-last bale 218. However, as the shuttle 28 is then shifted rearwardly as illustrated in FIG. 23, both of the dogs 64 and 66 are urged out into the extended positions by their springs 70 so as to impale the bottom of the bale 216 and to commence separating it from the next bale 218.

Figure 24:
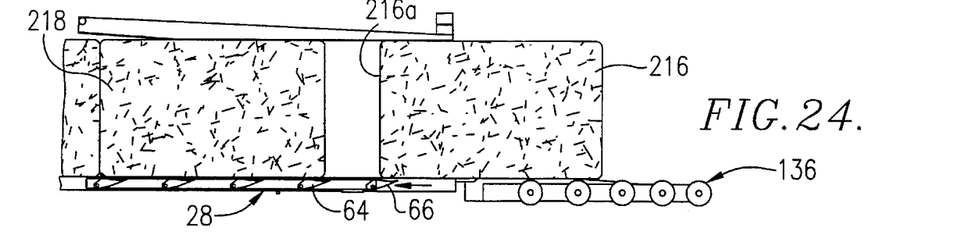
Figure 25:
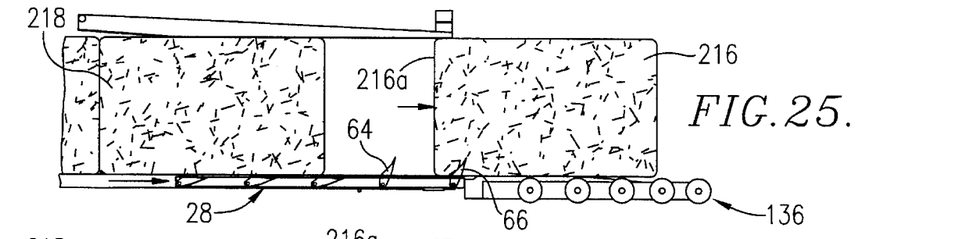

When the shuttle 28 reaches the end of its stroke, it is retracted as in FIG. 24, during which movement the dogs 64 and 66 are caused to be folded down by engagement with the bottom of the bale 216. When the shuttle 28 is then again actuated in an ejection stroke as illustrated in FIG. 25, the dogs 64 and 66 again flip up, although only the dog 66 is in position to actually engage and force the bale rearwardly during this stroke.

Figure 26:
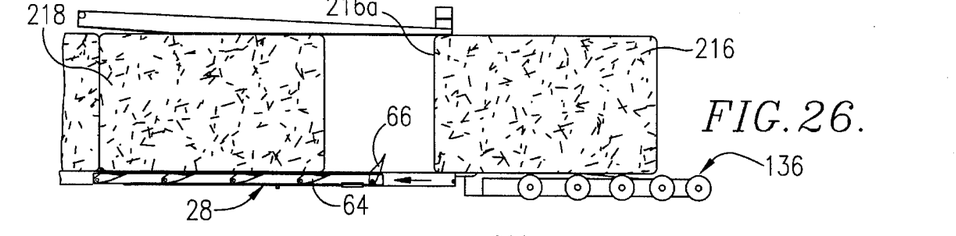
Figure 27:
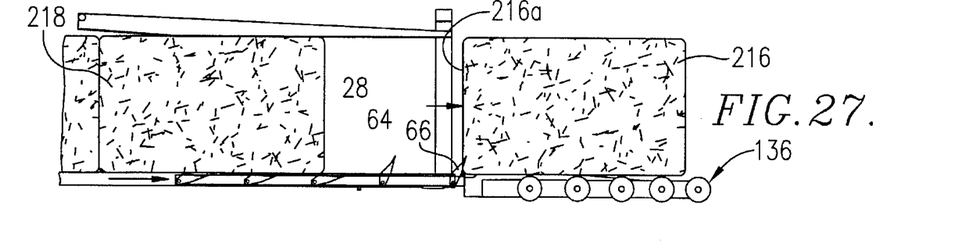
Figure 28:
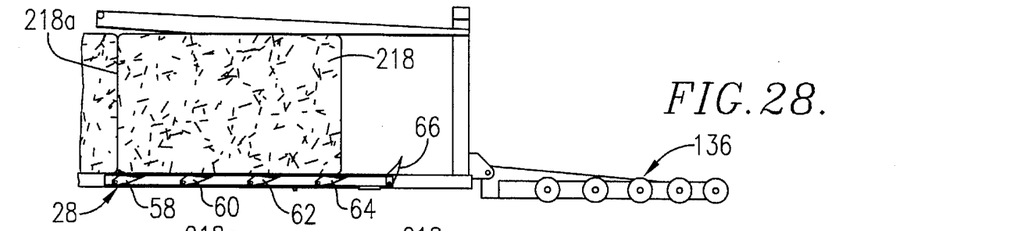
FIGS. 28–30 are schematic illustrations of the way in which the ejector is used to eject the next bale from the baler.

When the shuttle 28 is again retracted, the dog 66 is folded down momentarily until the front end 216*a* of the bale is cleared, whereupon the dog 66 flips up as illustrated in FIG. 26. Thereupon, during the next ejection stroke of the shuttle 28, the dog 66 engages the front end 216*a* of the bale and pushes it completely out onto the chute 136, the freewheeling rollers of which permit the ejected bale to slide slowly and gently down to the ground.

The operator may or may not plan to also discharge the bale 218. Although he may choose to then reset the dogs of the shuttle to immediately eject the next bale 218, he may instead wish to travel to another location in the same or different field before off-loading the bale 218. In any event, if he wishes to also eject the bale 218 after the bale 216 has been ejected, the operator again refers to the arrow decals 214*a–d* in FIG. 1 to ascertain the position of the front end 218*a* of the bale 218 relative to the arrows of those decals.

Figure 29:
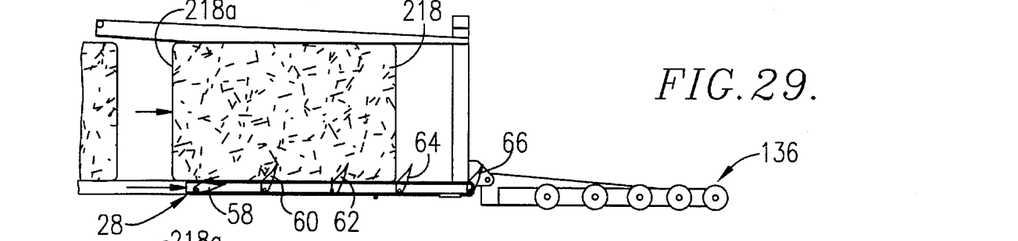
Figure 30:
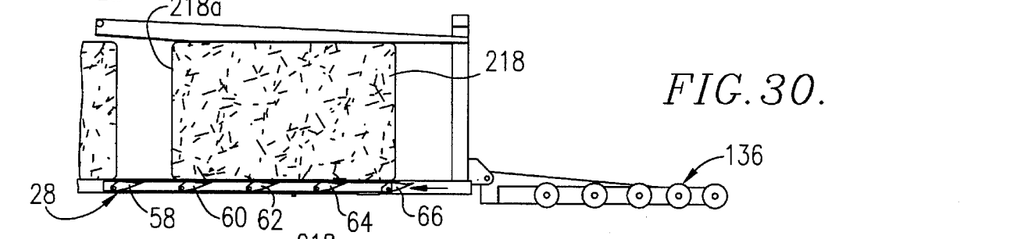

Assuming for the sake of illustration that the front end 218*a* falls somewhere forward of the arrow of the decal 214*d*, the operator then resets the selector levers 26 and 86 so that at least the four dogs 60, 62, 64 and 66 of each shuttle channel will slip up into operating position during the next ejection stroke of the shuttle. Thus, as illustrated in FIG. 29, as the shuttle 28 is shifted rearwardly, all of the dogs except the dogs 58 flip up so that at least the dogs 60 and 62 impale the bottom of the bale 214 and drive it rearwardly (optionally, the fifth dog 58 could also be set to flip up). The shuttle 28 then retracts as shown in FIG. 30 for another bite, whereupon at least the dogs 60, 62 and 64 will impale the bottom of the bale and drive it rearwardly. The operator continues the ejection and retraction strokes of the shuttle 28 by repeatedly operating the control switch 212 until the bale 214 is completely out of the baler and down the chute 136. Thereupon, the operator manipulates the selector levers 26 and 88 to hold down all of the lockable dogs, replaces the selector levers in their neutral and stored positions, and repressurizes the squeeze cylinders 24. Baling operations may then be resumed.

Figure 31:
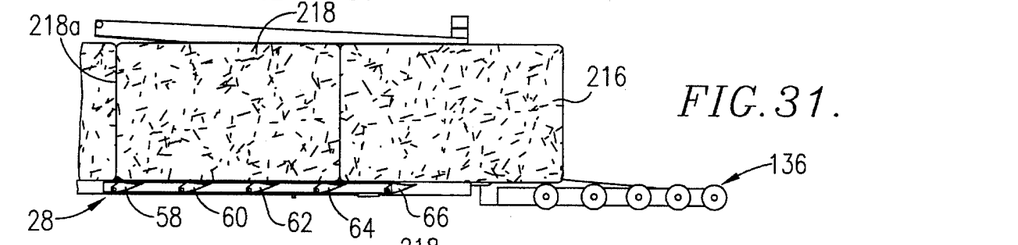
FIGS. 31, 32 and 33 are schematic illustrations of the way in which the ejector may be used to eject both the end bale and the next bale from the baler simultaneously.
Figure 32:
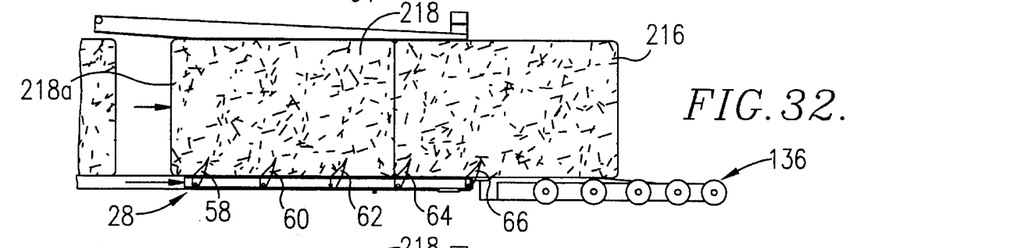
Figure 33:
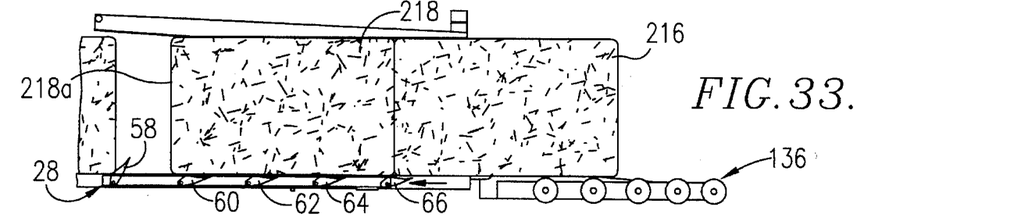

If, instead of discharging only the last bale 216 as in FIGS. 22–27 or discharging the two bales 216 and 218 one-at-a-time as in FIGS. 22–30, the operator chooses to discharge both bales simultaneously, the sequence of steps illustrated in FIGS. 31–33 takes place. Assuming the front end 218*a* of the next-to-the last bale 218 is located to the left of the arrow in decal 214*d* of FIG. 1, it is recommended that the ejector system be set up so that all five of the dogs on each channel of the shuttle flip out into operating position. Thus, after the squeeze cylinders are depressurized and other preliminary steps are carried out in the usual way, the operator manipulates both of the levers 26 and 88 such that they are pulled to their full rearmost extent as illustrated in FIG. 19. Consequently, as the shuttle 28 moves rearwardly in its first ejection stroke, all of the dogs 58–66 flip up to impale both of the bales 216 and 218 and move them rearwardly in unison. As the shuttle 28 retracts as in FIG. 33, the dogs are folded down to prevent retrograde movement of the bales. Repeated extension and retraction strokes of the shuttle 28 are then carried out until both bales 216 and 218 are fully ejected. At that time, the operator may replace the dogs in their retracted positions and store the selector levers to resume baling operations.

During the ejection strokes of the shuttle 28 to unload the bales as described above, the coupling 166 between the power cylinder 48 and the chute 136 has remained disengaged such that the collar 170 merely slips back and forth along the push link 174 as shown in FIGS. 10 and 11. The locking lever 180 of coupling 166 has been in the unlocked position of FIGS. 13 and 14 during this activity.

If the operator desires to place the chute 136 in the transport position, however, he first makes certain that the shuttle 28 is fully retracted so that the collar 170 is in its home position between the cross pin 194 and the cross peg 198 as in FIG. 10. By then grasping the locking lever 180 and rotating it slightly to the FIG. 15 position, the collar 170 becomes trapped between the cross pin 194 and the cross peg 198, thus effectively engaging the coupling 166. Consequently, when the power cylinder 48 is then extended as the operator manipulates the control switch 212, the collar 170 pushes against the cross pin 194 which in turn causes the push link 174 to swing the chute 136 up into the transport position as illustrated in FIG. 12. This is also illustrated in FIG. 1. With the chute 136 so raised, the chains 156 may be locked in the retainers 158, whereupon the machine is ready for roading.

When it is time to lower the chute 136 into its unloading position, the operator merely unlocks the chains 150 from their retainers 158 and retracts the power cylinder 48, allowing the chute 136 to slowly return to its lowered position, retarded in such motion by the hinge brakes 200. The locking lever 180 is thereupon returned to its unlocked position to disengage the coupling 166.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of their invention as pertains to any apparatus not materially departing from but outside the literal scope of the invention as set out in the following claims.

We claim:

1. In an extrusion type baler having a base case defining a base chamber and a bale discharge outlet through which bales are incrementally discharged from said bale chamber as a result of successive strokes of a compacting plunger, mechanism for use in selectively ejecting an end bale only, or both the end bale and a next-to-the-end bale, from the outlet independently of the plunger comprising:

a shuttle selectively shiftable axially of the bale case generally toward and away from said outlet in repetitive ejecting strokes, said shuttle having a plurality of projections arranged in an axially extending series, at least certain of said projections being selectively placeable in either an extended position projecting into the bale chamber or a retracted position disposed outside of the bale chamber;

a selector assembly for controlling which of said projections is disposed in the extended position and which is disposed in said retracted position; and power means operably coupled with said shuttle for shifting the shuttle when selected projections are in the extended position whereby to engage and advance a corresponding bale through the outlet.

2. In a baler as claimed in claim 1, each of said projections being provided with means for yieldably biasing the projection toward said extended position.

3. In a baler as claimed in claim 2, said selector assembly including structure for releasably retaining a selected projection in said retracted position against the force of said yieldable biasing means.

4. In a baler as claimed in claim 3, said structure including a member carried by said shuttle for selective axial shifting relative to the shuttle, said member having a series of axially spaced keepers disposed to engage and retain a corresponding projection in said retracted position depending upon the axially shifted position of said member relative to the shuttle.

5. In a baler as claimed in claim 4, said selector assembly further including a device for adjustably shifting said member relative to the shuttle to place said keepers in their selected axial positions.

6. In a baler as claimed in claim 5, said device comprising an operating lever mounted on the bale case and selectively engageable with said member.

7. In a baler as claimed in claim 1, said selector assembly including a member shiftably carried by said shuttle for selective axial shifting of the member relative to the shuttle, said member having a series of axially spaced keepers disposed to engage and retain a corresponding projection in said retracted position depending upon the axially shifted position of said member relative to the shuttle.

8. In a baler as claimed in claim 7, said selector assembly further including a device for adjustably shifting said member relative to the shuttle to place said keepers in their selected axial positions.

9. In a baler as claimed in claim 8, said device comprising an operating lever mounted on the bale case and selectively engageable with said member.

10. In a baler as claimed in claim 1, said bale case including a wall that partially defines said bale chamber, said wall including an axially extending, generally hollow rail which slideably engages bales as they move through the bale chamber, said shuttle including an axially extending beam received within and shiftable axially relative to the rail during bale ejection, said projections being attached to and carried by said beam for movement therewith when the shuttle is shifted in its ejecting strokes, said rail having a clearance space therein and through which the projections may extend when the projections are in their extended positions.

11. In a baler as claimed in claim 10, each of said projections being provided with means for yieldably biasing the projection toward said extended position.

12. In a baler as claimed in claim 11, said selector assembly further including an elongated member shiftably received within the beam for adjustable axial shifting of the member relative to the beam, said member having a series of axially spaced keepers disposed to engage and retain a corresponding projection in said retracted position against the bias of said yieldable means depending upon the axially shifted position of said member relative to the beam, said member having a series of clearance openings therein disposed for registration with the space in said rail and a series of apertures in said beam for clearing the projections during their movement between extended and retracted positions.

13. In a baler claimed in claim 12, said selector assembly further including an operating lever mounted on said bale case and selectively engageable with said member for effecting said adjustable shifting thereof.

14. In a baler as claimed in claim 1, said bale case having a discharge chute hingedly connected thereto for placement in either a downwardly inclined unloading position or a generally upright, transport position; and a selectively engageable coupling between said discharge chute and said power means for causing the chute to be raised and lowered between said positions when the coupling is engaged and the power means is operated, yet maintaining the chute unaffected in its unloading position when the coupling is disengaged and the power means is operated.

15. In a baler as claimed in claim 14, said coupling including a push link having a cranked connection with the chute, a slip collar moveable with the shuttle during said axial shifting thereof, and selectively engageable locking means for allowing said link to slip through the collar without affecting the chute when the locking means is disengaged and for securing the collar to the link to transmit the power of said power means to the chute when the locking means is engaged.

16. In an extrusion type baler having a bale discharge outlet through which bales are incrementally discharged from a bale chamber as a result of successive strokes of a compacting plunger, the improvement comprising:

auxiliary ejector mechanism for ejecting bales through the discharge opening independently of the plunger, said auxiliary mechanism including a power cylinder that is extended and retracted during operation of the mechanism;

a bale discharge chute for receiving bales from the outlet and guiding them to the ground, said chute being hingedly connected to the baler for placement in either a lowered unloading position or a raised transport position; and a selectively engageable coupling between said power cylinder and the chute for permitting the cylinder to extend and retract without affecting the chute when the coupling is disengaged yet cause the chute to be raised and lowered between said positions when the coupling is engaged.

17. In a baler as claimed in claim 16, said coupling including a push link having a cranked connection with the chute, a slip collar moveable with the power cylinder during said extension and retraction thereof, and selectively engageable locking means for allowing said link to slip through the collar without affecting the chute when the locking means is disengaged and for securing the collar to the link to transmit the power of said power cylinder to the chute when the locking means is engaged.

18. In a baler as claimed in claim 16, said auxiliary ejector mechanism including means for use in selectively ejecting an end bale only, or both the end bale and a next-to-the-end bale from the outlet.

* * * * *